US011361165B2

(12) United States Patent
Barker et al.

(10) Patent No.: US 11,361,165 B2
(45) Date of Patent: Jun. 14, 2022

(54) METHODS AND SYSTEMS FOR TOPIC DETECTION IN NATURAL LANGUAGE COMMUNICATIONS

(71) Applicant: THE CLOROX COMPANY, Oakland, CA (US)

(72) Inventors: Thomas Barker, Durham, NC (US); Suprit Singh, Durham, NC (US)

(73) Assignee: THE CLOROX COMPANY, Oakland, CA (US)

( * ) Notice: Subject to any disclaimer, the term of this patent is extended or adjusted under 35 U.S.C. 154(b) by 149 days.

(21) Appl. No.: 16/832,805

(22) Filed: Mar. 27, 2020

(65) Prior Publication Data

US 2021/0303795 A1 Sep. 30, 2021

(51) Int. Cl.
*G06F 40/237* (2020.01)
*G06F 40/284* (2020.01)
*G06F 40/289* (2020.01)
*G06F 40/30* (2020.01)
*G06F 16/31* (2019.01)
*G06F 40/242* (2020.01)

(52) U.S. Cl.
CPC ............ *G06F 40/30* (2020.01); *G06F 16/316* (2019.01); *G06F 40/242* (2020.01); *G06F 40/284* (2020.01)

(58) Field of Classification Search
CPC ...... G06F 40/20; G06F 40/205; G06F 40/237; G06F 40/242; G06F 40/279; G06F 40/284; G06F 40/289; G06F 40/30
USPC .................. 704/1, 9, 10; 707/711, 738, 741
See application file for complete search history.

(56) References Cited

U.S. PATENT DOCUMENTS

| | | | | |
|---|---|---|---|---|
| 4,750,122 A * | 6/1988 | Kaji | ...................... | G06F 40/284 704/1 |
| 6,098,034 A * | 8/2000 | Razin | .................... | G06F 40/289 704/9 |
| 8,498,999 B1 * | 7/2013 | Bhalotia | .............. | G06F 40/157 707/767 |
| 10,002,187 B2 * | 6/2018 | McCandless | ......... | G06F 16/334 |
| 10,147,122 B2 * | 12/2018 | Hurley | .................. | G06F 40/253 |
| 10,339,826 B1 * | 7/2019 | Somasundaran | ..... | G06F 40/242 |
| 10,847,140 B1 * | 11/2020 | Conner | .................... | G06F 40/30 |
| 2002/0052730 A1 * | 5/2002 | Nakao | ................... | G06F 40/258 704/10 |
| 2002/0052901 A1 * | 5/2002 | Guo | ........................ | G06F 40/20 715/247 |
| 2008/0126074 A1 * | 5/2008 | Whitelock | ............. | G06F 40/45 704/2 |
| 2009/0019356 A1 * | 1/2009 | Deyab | .................... | G06F 40/30 715/231 |
| 2010/0153094 A1 * | 6/2010 | Lee | ..................... | G06F 16/3329 704/9 |

(Continued)

*Primary Examiner* — Martin Lerner
(74) *Attorney, Agent, or Firm* — Kilpatrick Townsend & Crew LLP

(57) ABSTRACT

Techniques are disclosed for processing natural language communications. A computing device receives a set of natural language communications. The computing device generates a word index from the communications and generates, from the word index, a set of topics, each topic including two or more words. For each topic, the computing device generates a score indicative of an amount of semantic information represented by the topic. The computing device then discards topics that are supersets or subsets of other topics. The computing device presents the remaining topics based on to the score of each topic.

20 Claims, 8 Drawing Sheets

(56) References Cited

U.S. PATENT DOCUMENTS

| | | | |
|---|---|---|---|
| 2012/0096029 A1* | 4/2012 | Tamura | G06F 40/279 707/772 |
| 2013/0138641 A1* | 5/2013 | Korolev | G06F 40/30 704/9 |
| 2014/0019119 A1* | 1/2014 | Liu | G06F 40/131 704/9 |
| 2015/0262069 A1* | 9/2015 | Gabriel | G06F 16/9535 706/48 |
| 2015/0317303 A1* | 11/2015 | Zhang | G06F 40/40 707/776 |
| 2017/0132314 A1* | 5/2017 | Liu | G06F 40/30 |
| 2017/0154100 A1* | 6/2017 | Mansour | G06F 16/31 |
| 2017/0228614 A1* | 8/2017 | Gandhi | G06F 40/279 |
| 2017/0329762 A1* | 11/2017 | Lintz | G06F 40/279 |
| 2018/0189270 A1* | 7/2018 | Chakraborty | G06F 40/284 |
| 2019/0095521 A1* | 3/2019 | Milleron | G06F 40/289 |
| 2019/0121905 A1* | 4/2019 | McManis, Jr. | G06F 40/30 |
| 2019/0236206 A1* | 8/2019 | Chowdhury | G06F 40/242 |
| 2019/0362021 A1* | 11/2019 | Balduino | G06F 40/289 |

\* cited by examiner

METHODS AND SYSTEMS FOR TOPIC DETECTION IN NATURAL LANGUAGE COMMUNICATIONS

TECHNICAL FIELD

This disclosure generally relates to natural language processing. More specifically, but not by way of limitation, this disclosure relates to processing natural language communications to identify candidate topics associated with objects (e.g., using word collocation) and to prune the candidate topics by assessing topic overlap.

BACKGROUND

End users interact with online content in a variety of ways. For example, users may add comments to online forums to communicate about products or services. Content of online forums can be analyzed using natural language analysis to identify various topics (e.g., sematic information within content of the online forum). Natural language analysis of online content is often resource intensive (e.g., in terms of both processing and time) due to the ever-evolving nature of online content. Manual approaches (e.g., a user manually reading the content) cannot keep up with the volume of content or the large distribution of content across domains (e.g., different computing device, websites, etc.). Thus, manual approaches frequently discard a significant amount of semantic information through the inability to ingest the volume of content from all sources.

Automated techniques for processing natural language frequently can use machine-learning (e.g., such a predictive classifiers) to classify content according to an enumerated set of possible classifications (e.g., topics). During training of the machine-learning model, particularly during supervised training, the model associates each input data element with a label (classification) that is already known. The model then predicts the classification and uses the label to confirm the classification, making adjustments to the model to improve the predictions. Building or selecting a training data set that includes labels frequently involves human review of content to identify one or more classifications. Selecting too many classifications causes too much noise to derive useful information. Selecting too few classifications causes important information to be discarded. Thus, current approaches to natural language analysis may fail to capture the information from constantly evolving content.

SUMMARY

Aspects of the present disclosure include methods of processing natural language communications. The method includes: receiving, at a first computing device, a set of communications, each communication of the set of communications including alphanumeric text associated with an object; generating a word index using the alphanumeric text, the word index including words derived from the alphanumeric text; generating, from the word index, a set of topics, each topic of the set of topics including two or more words of the word index; generating, for each topic of the set of topics, a score indicative of an amount of semantic information represented by the topic; determining that the two or more words of a first topic of the set of topics is a superset of the two or more words of a second topic of the set of topics; determining, based on comparing a first score of the first topic with a second score of the second topic, that the first score of the first topic is higher than the second score of the second topic; removing, from the set of topics, the second topic; and transmitting, to a second computing device, the set of topics.

Another aspect of the present disclosure includes a system comprising one or more processors and a non-transitory computer-readable media that includes instructions that when executed by the one or more processors, cause the one or more processors to perform the methods described above.

Another aspect of the present disclosure include a non-transitory computer-readable media that includes instructions that when executed by one or more processors, cause the one or more processors to perform the methods described above.

These illustrative examples are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
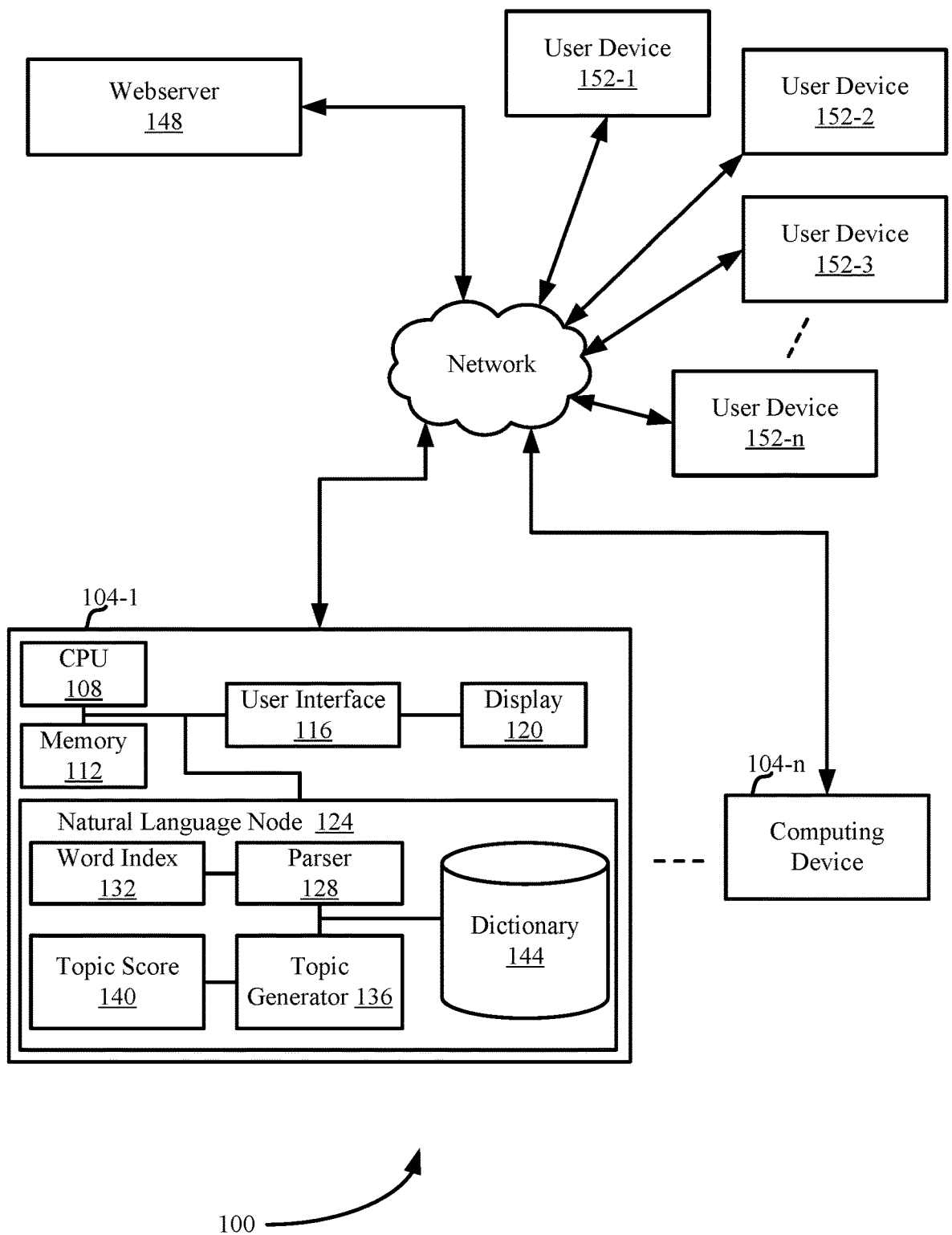
FIG. 1 depicts an example of a network environment providing natural language analysis of communications received from distributed user devices, according to at least one aspect of the present disclosure.

The present disclosure involves natural language processing of communications received from user devices to identify representative topics within the communications. User devices interact with online services (e.g., webpages) that provide forums in which the client device comments on objects (e.g., object reviews, objects for sale, objects previously acquired, etc.). The natural language analysis described herein derives a set of topics representing reoccurring or significant semantics of the communications. For example, the topics may be representative of how users perceive products or services associated with a particular online service such as, for example, how the objects or service are used, relevant descriptions of the products or services, improvements to the objects or services, evaluations of the products or services such as effectiveness, suitability of intended purposes, etc. The computing device can analyze communications to derive relevant topics without foreknowledge of the context of the communications or topics within the communications.

The following non-limiting example is provided to introduce certain aspects of the present disclosure. A webpage that sells objects includes a forum enabling user devices to post comments (e.g., object reviews from users who purchased an object, questions and/or comments about the objects, etc.). A user device may transmit communications that include natural language text associated with a particular object. A client device, such as the host or operator of the webpage may transmit a request to perform a natural language analysis of the communications to determine more information about user perception of the objects. A remote computing device receives the request from the client device and initiates a natural language analysis of the communications.

The natural language analysis begins by preprocessing the text within the communications by parsing the text into words and generating a word index. The word index represents the words of the communications in an order in which the words appear in the communications with each word being associated with an index value indicating the position of the word within the word index. The computing device defines a set of topics from the word index with each topic representing a portion of the semantic meaning of the communications and including two or more words from the word index. The two or more words are positioned within the topic in a same order in which the words are positioned in the word index.

The computing device generates a topic list that includes the set of topics. The topic list includes topics that occur more than once (e.g., topics that match another topic). Each topic in the topic list is assigned a score that indicates an amount of semantic information represented by the topic. For instance, the score may be based on the frequency in which the two or more words of the topic occur in the communications, the frequency in which the words that make up the topic occur in the communications (e.g., in a different order or outside the topic), and/or the number quantity of words of the topic.

In some instances, the topic list may be pruned by removing topics that represent false positives (e.g., topics that appear relevant, but are actually artifacts of the underlying grammar) and redundant topics. In one example, topics that include a conjunction, subordinating conjunction, or correlative conjunction may be removed if the conjunction, subordinating conjunction, and/or correlative conjunction do not occur in the middle of the two or more words (e.g., with at least one word preceding and one word following the conjunction, subordinating conjunction, and/or correlative conjunction). In another example, the words of each topic are evaluated against the words of other topics to determine if the topic is a subset or a superset of another topic. A first topic is a subset of a second topic if the words of first topic also appear in the second topic in the same order. The first topic is a superset of the second topic if the words of the second topic appear in the first topic in the same order as the words appear in the second topic. If the topic is identified as being a subset or a superset, the topic with the lower score is discarded from the topic list.

The remaining topics in the topic list are representative of the semantics of the communications. The topics in the topic list may be stored in association with the object and/or service associated with each topic. The topics may be presented to a computing device through a graphical user interface or the like. For instance, a selection of a particular object and/or service may cause a graphical user interface to be displayed presenting topics associated with the selected object and/or service. The topics may be organized according the score assigned to the topic. User input selecting a particular topic can cause another graphical user interface to be displayed presenting one or more of the communications from which the topic was derived.

FIG. 1 shows an example of a network environment 100 providing natural language analysis of communications received from distributed user devices according to at least one aspect of the present disclosure. The network environment 100 includes a computing device 104-1 configured to process the text within communications received from a set of user devices. The text may be alphanumeric text that is presented in a natural language format. In some instance, the communications may be processed in a distributed computing environment. In those instances, network environment 100 can include additional computing devices 104-2 (not shown) through 104-n. The computing device 104-1 through 104-n may scale with the processing load such that when the load increases additional computing devices 104-n may be added to balance the load on any individual computing device. Computing device 104-1 or a central server may operate as a load balance distributing smaller portions of the processing tasks to computing devices 104-1 through 104-n.

One or more communications (e.g., object and/or services related communications) may be transmitted by one or more of user devices 152-1 through 152-n and received by computing device 104-1 (and/or other computing devices 104-n). In some instances, the communications include alphanumeric text. The alphanumeric text may be posted on a webpage hosted by webserver 148. For instance, one or more of the communications may correspond to reviews of a particular object posted to an online forum hosted by webserver 148. In another instance, one or more of the communications may correspond to content of a product marketing webpage (e.g., either content of the webpage itself or comments posted by users regarding the product marketing webpage). The communications can include communications posted to any of one or more digital forums (e.g., social media posts, webpages of object retailers, message boards, emails, text messages, combinations thereof or the like). Computing devices 104-1 through 104-n (or another device that is not shown) may access webserver 148 through the network to obtain the one or more communications (e.g., using a web crawler or the like). Alternatively, webserver 148 may aggregate one or more communications (e.g., such as those relating to a same object or service) and transmit the communications to one or more of computing devices 104-1 through 104-n.

Computing device 104-1 includes one or more processors 108 connected along a bus with one or more volatile and/or non-volatile memories 112. The one or more processors 108 generate user interface 116 for display by a display device 120. Users may interact with computing device 104-1 through input devices (e.g., mouse, keyboard, etc.) to operate the natural language processing incoming communications. Computing device 104-1 can include other hardware or software components in addition to or in place of those shown in FIG. 1. In addition computing devices 104-1 through 104-n can include the same hardware and software or different hardware and/or software.

Computing device 104-1 includes a natural language node 124 for processing the natural language text within incoming communications. Natural language node 124 includes modules 128-144 that can include software instructions (e.g., executable by the one or more processors 108), hardware such as a specialized hardware platform (e.g., processors, memories, field programmable gate arrays, application-specific integrated circuits, etc.), or a mixture of hardware and software. In some instances, natural language node 124 may execute natural language analysis as part of a distributed environment in which a plurality of natural language nodes may process portions the incoming communications. In those instances, natural language node may correspond to one node of the distributed system that may process some or all of the income communications. Parser 128 parses incoming text into a normalized form. Parser 128 tokenizes alphanumeric characters in communications by identifying each set of characters that follows a space and precedes another space. In some instances, parser 128 may provide preprocessing of each token (e.g., set of characters) such as, but not limited to, removing spaces, numbers, special characters (e.g., non-alphabetical characters), and articles (e.g., 'a', ' the', 'of', etc.), lemmatizing each word (reducing words to a base form), etc. For instance, a communication can include "No use crying over spilled milk!". Parser 128 may generate the following lemmatized word set: 'no', 'use', 'cry', 'over', 'spill', 'milk'.

In some instances, the lemmatizing process may not be able to identify the root of an input word. For example, words that are slang or made up may not have an identifiable root word. In those instances, parser 128 attempts to lemmatize each word. If the parser 128 fails to lemmatize a word, then the parser 128 keeps the original (non-lemmatized) word. This enables the natural language node 124 to identify topics in communications that include different languages, slang, or the like. In other instances, if the parser 128 fails to generate a lemmatized version of a word, word may be discarded.

Parser 128 parses each normalized word to word index 132, which stores each word as a key/value pair. Each word can be represented by a key (e.g., the word) and a value (e.g., the position within the index in which the word is stored). Returning to the example above, parser 108 passes the words 'no', 'use', 'cry', 'over', 'spill', 'milk', to be stored in word index 132. Once stored, the words can be represented as (0, 'no'), (1, 'use'), (2, 'cry'), (3, 'over'), (4, 'spill'), (5, 'milk'). Word index 132 enables words to be identified either by the word itself by its position within word index 132, or by its position within a communication. Wordindex 132 also preserves the ordering of the words in the received communications. Word index 132 may include words from one communication or from a plurality of communications. For instance, the words of word index 132 may be positioned in the order in which the words appear in the communication and the words of each communication may appear in the order in which the communications were received by computing device 104-1 or otherwise timestamped (e.g., such as a timestamp indicating when the communication was drafted, transmitted, posted on a webpage or forum, received, or the like). For instance, a first communication "No use crying over spilled milk!" received before a second communication: "crying over a glass of spilled milk" will be represented within word index 132 as: (0, 'no'), (1, 'use'), (2, 'cry'), (3, 'over'), (4, 'spill'), (5, 'milk'), (6, 'cry'), (7, 'over'), (8, 'glass'), (9, 'spill'), (10, 'milk').

Topic generator 136 uses word index 132 to define a set of topics, each topic in the set of topics including two or more words from the word index in a same order in which the words appear in the index. In some instances, topic generator 136 identifies topics that occur more than once within the word index and discards those topics that do not occur more than once. For instance, continuing the example above, topic generator 136 may identify the topics ('cry', 'over') and ('spill', 'milk') occur more than once and may be retained while topic ('use', 'over') may be discarded as the topic occurs only once. Topic score 140 generates and stores a score of each remaining topic according to a ranking function. For instance, the ranking function may be based on a number of factors such as a quantity of words stored by the topic, frequency in which the topic occurs in word index 132, frequency in which individual words of the topic occur (in a different order or outside the topic) in word index 132, combinations thereof and the like. Under these factors both ('cry', 'over') and ('spill', 'milk') would be assigned the same score as both topics include the same quantity of words, that occur at the same frequency, and neither topic includes words that appear elsewhere word index 132.

Natural language node 124 may store topics in dictionary 144. In some instances, natural language node 124 may store all topics generated by topic generator 136. In other instances, only topics with an assigned score exceeding a threshold may be generated in dictionary 144. Dictionary 144 may be part of a larger dictionary of topics. For instance, dictionary 144 may store the topics (all topics or those exceeding a particular assigned score) generated by computing device 104-1. In addition, computing device 104-1 may receive topics generated by other computing devices 104-n during the course of a distributed processing job. Computing device 104-1 may transmit the topics generated by computing device 104-1 to other computing devices 104-n such that each computing device in the network includes a complete dictionary. In other instances, dictionary 144 may only be a local instance (storing local topics). In that case, a central database or server (not shown) may receive the topics generated by each computing device 104-1 through 104-n to form a complete dictionary of the processing job.

The topics resulting from processing communications may be displayed by a user interface 116 displayed by display 120. Alternatively or additionally, the results generated by natural language node 124 may be transmitted through a network interface (not shown) of computing device 104-1 to another computing device 104-n, to one or more of the user devices 152-1 through 152-n, to a server (not shown), to a central database (not shown) accessible by other remote devices, combinations thereof or the like. User interface 116 may enable user input to interact with the generated topics such as, but not limited, identifying related topics, displaying communications from which topics were generated, identifying frequency in which particular topics occurred or the frequency in which communications containing a particular topic was received, combinations thereof, or the like.

Figure 2:
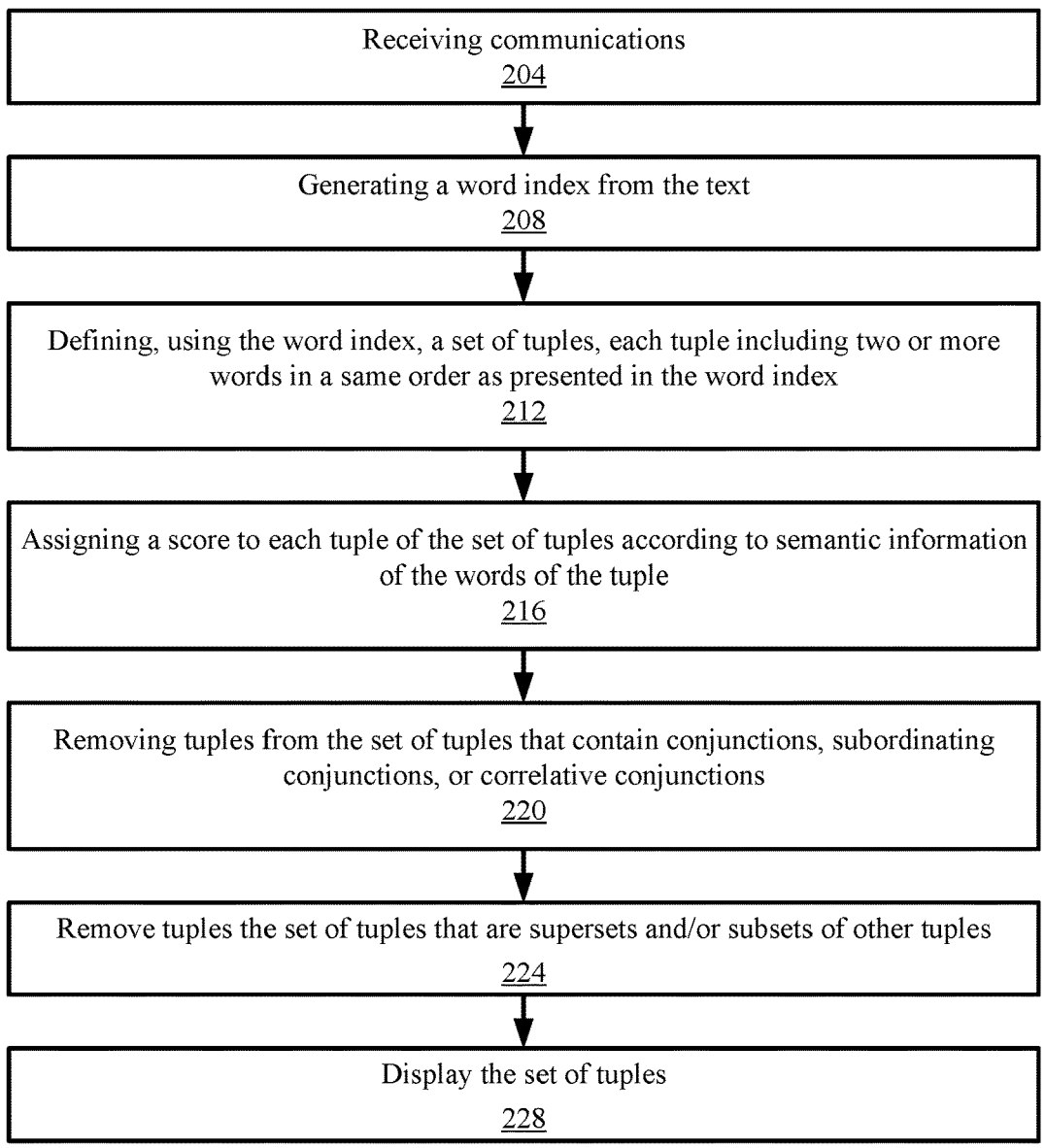
FIG. 2 depicts an example of a process for natural language analysis of communications to identify topics, according to at least one aspect of the present disclosure.

FIG. 2 depicts an example of a process for natural language analysis of communications to identify topics, according to at least one aspect of the present disclosure. The process may be executed within network environment 100 of FIG. 1, within a hardware process, a software process, or within a hybrid hardware/software process. The process begins a block 204, where a natural language node receives communications that include natural-language, alphanumeric characters. The communications may be received from one or more remote user devices. The communications may correspond to objects or services associated with a particular domain (such as provider of objects or services).

At block 208, the natural language node generates a word index from the alphanumeric text. The word index stores words derived from the alphanumeric text in a key/value pair in which the key corresponds to the word and the value corresponds to the position of the word within the index.

At block 212, the natural language node generates topics. The natural language node may receive (or use a predetermined value for) a word count value and a window length value. The natural language node begins generating topics by setting a current index value to be index value zero. Then, at the current index value, topics are generated that include a quantity of words (e.g., equal to the word count value) selected from the word index in a same position as the words appear in the word index. For instance, the first iteration generates a first set of topics with each topic including words of the word index that are positioned between the current index value (e.g., index zero) and an index value equal to the word count value plus the window length value minus one. To prevent duplicate topics from being formed, the first word of each topic is equal to the word positioned at the current index value with the remaining words (e.g., the quantity of which is equal to the word count value minus one) being selected from the other words within the window.

Once all of the topics in the first set of topics are generated, the current index value is incremented by one and a second set of topics is generated for the topic list. The second set of topics includes words positioned between the current index value (with current index value being equal to index value one during this second iteration) and the index value equal to the word count value plus the window length value. The first word of each topic of the second set of topics is the word positioned at the incremented current index value. Once the second set of topics is generated, the current index value is incremented again and the process continues until all topics at the word count value are generated.

In some instances, once all of the topics are generated, the natural language node may identify the topics of topics that occur more than a predefined number of times (e.g., more than once). The natural language node identifies the indexes of the reoccurring topics. The natural language node may then increment the word count value and iterate over the word index again generating topics with a quantity of words equal to the word count value plus one. In some instances, the words at index values not equal to the indices of the words that make up the reoccurring topics may be discarded. During the new iteration, the natural language node may iterate over the reduced word index because each topic that occurs more than once at the word count value is a subset of the topics that will be generated at the word count value plus one. This reduces the overall number of iterations needed to generate topics and reduces the amount of noisy (e.g., semantically insignificant) topics generated as the word count value increases. The word count value may be incremented until topics generated by the word count value fail to generate duplicate topics. The generated topics may be added to a topic list and further processed.

At block 216, a score is assigned each topic of the topic list. The score represents an amount of semantic information of the topic. In some instances, the score may be based on a number of factors such as a quantity of words stored by the topic, frequency in which the topic occurs in word index 132, frequency in which individual words of the topic occur (in a different order or outside the topic) in word index 132, combinations thereof and the like. For example, the score may be defined by $$\text{score} = \frac{f^l}{\prod \sqrt{n}}$$

where f is equal to the number of times (e.g., the frequency) that the topic occurs, l is equal to the quantity of words in the topic (e.g., topic length), and n is equal to the number of times that each word in the topic occurs minus f. In some instances, the score may be re-defined as $$\text{score} = \frac{f^l}{\prod \sqrt{x_i - f}}$$

where $x_i$ represents the total number of times the word (x) at each position (i) of the topic occurs in the word index.

For example, assume that the topic ('cry', 'over', 'spill', 'milk') occurs 10 times and the words 'cry' occurs 17 times, 'over' occurs 13 times, 'spill' occurs 11 times, and 'milk' occurs 12 times. In this example, f is equal to 10 (e.g., the frequency in which the topic occurs), l is equal 4 (e.g., the quantity of words in the topic). x has four values depending on the value i. For instance, when i=0, x is equal 17 (e.g., the frequency of occurrence of the word 'cry'); when i=1, x is equal 13 (e.g., the frequency of occurrence of the word 'over'); when i=2, x is equal 11 (e.g., the frequency of occurrence of the word 'spill'); and when i=3, x is equal 12 (e.g., the frequency of occurrence of the word 'milk'). Thus, the score for this example topic and scenario evaluates to a $$\text{score} = \frac{10^4}{\sqrt{17-10} * \sqrt{13-10} * \sqrt{11-10} * \sqrt{12-10}}.$$

In some instances, such as when the frequency in which a topic occurs is equal to the frequency in which a word of the topic occurs (e.g., $x_i$=f), a divide by zero error may occur. Score errors can be mitigated for by setting the value of $x_i$−f to be a first predetermined value. The first predetermined value can be set to a real number that is greater than zero. For example, the first predetermined value may be set to 1.1 such that if $x_i$−f=0 then the zero is replaced with 1.1. This may affect the overall results because topics with a divide by zero error may receive similar scores as topics with $x_i$−f=1. In that case, a second predetermined value may be set for instances where $x_i$−f=1. The second predetermined value may be set to a real number that is greater than the first predetermined value. For instance, if the first predetermined value is set to 1.1, then the second predetermined value may be set to 1.3. The first and second predetermined values may be set to any positive values in which the first predetermined value is smaller than the second predetermined value. In some instances, the values for the first predetermined value and/or the second predetermined value may be set by user input.

At block 220, some topics from the topic list may be removed as being false positives that are assigned a high score despite being semantically insignificant. For instance, false positives may include conjunctions (e.g., 'and', 'but', 'if', etc.), subordinating conjunctions (e.g., 'although', 'because', etc.), or correlative conjunctions. (e.g., pairs of words that relate part of a sentence to another such as 'both' and 'and', 'neither' and 'nor', etc.). If the false positives do not occur within the topic (e.g., with a least one preceding and at least one word following the conjunction, subordinating conjunction, or correlative conjunction), then the topic is removed from the topic list. The natural language node may enumerate a list of false positives as stop words. The natural language node may remove topics that include a stop word that appears first or last in the topic.

At block 224, the natural language node identifies redundant topics in the topic list. A redundant topic is a topic that is estimated or determined to consist of or correspond to a word group that is a subset or a superset of a word group of or corresponding to another topic. The natural language node evaluates the topics for redundancy against a dictionary. The dictionary represents words of a topic using key/value pairs, where a key represents a unique word and a corresponding value is equal to the index value of the topic in the word index. If a word of a new topic is already in a dictionary (e.g., identified by matching keys), then the new topic may be a subset or a superset of an existing topic. The natural language node determines an intersection of the all the words of topics positioned at the index value equal of the word of the new topic. The intersection identifies common subsets of words between two topics. If the intersection is zero (or an empty set), then the new topic is not a subset or superset of an already identified topic. If the intersection is non-zero, then the topic in the dictionary is a subset or a superset of the topic to be added. The natural language node may then identify the topic with a higher score and discard the topic with the lower score.

For instance, if a first topic to be added to the dictionary intersects with a second topic stored in the dictionary and the first topic has a higher score, the first topic will replace the second topic and the second topic may be discarded from the topic list. If a first topic to be added to the dictionary intersects with a second topic stored in the dictionary and the second topic has a higher score, then first topic will be discarded by removing the first topic from the topic list.

At block 228, the remaining topics in the topic list represent topics that may be semantically significant (e.g., include semantic information that represents the communication). These topics may be displayed via a graphical user interface. In some instances, the topics may be displayed in an order in which the topics appear in the topic list (e.g., from a highest score to a lowest score or vice versa). User input may be received selecting a particular topic. The user input may include a request for the alphanumeric text of a communication associated with a particular topic. The natural language node may retrieve one or more communications each of which includes the topic. In some instances, the natural language node may retrieve communications and search the words of the communications for topics that match the particular topic. The natural language node may analyze groups of words in a sliding window with a length equal to the window that produced the topic during block 212. If a communication includes the topic, then the text of the communication may be displayed alongside the particular topic.

The process of FIG. 2 may terminate once the topic list is presented or once user input is received terminating the process. In some instances, the process may wait until more communications are received for processing by the natural language node. Once further communications are received, the process of FIG. 2 may restart at block 204.

Figure 3A:
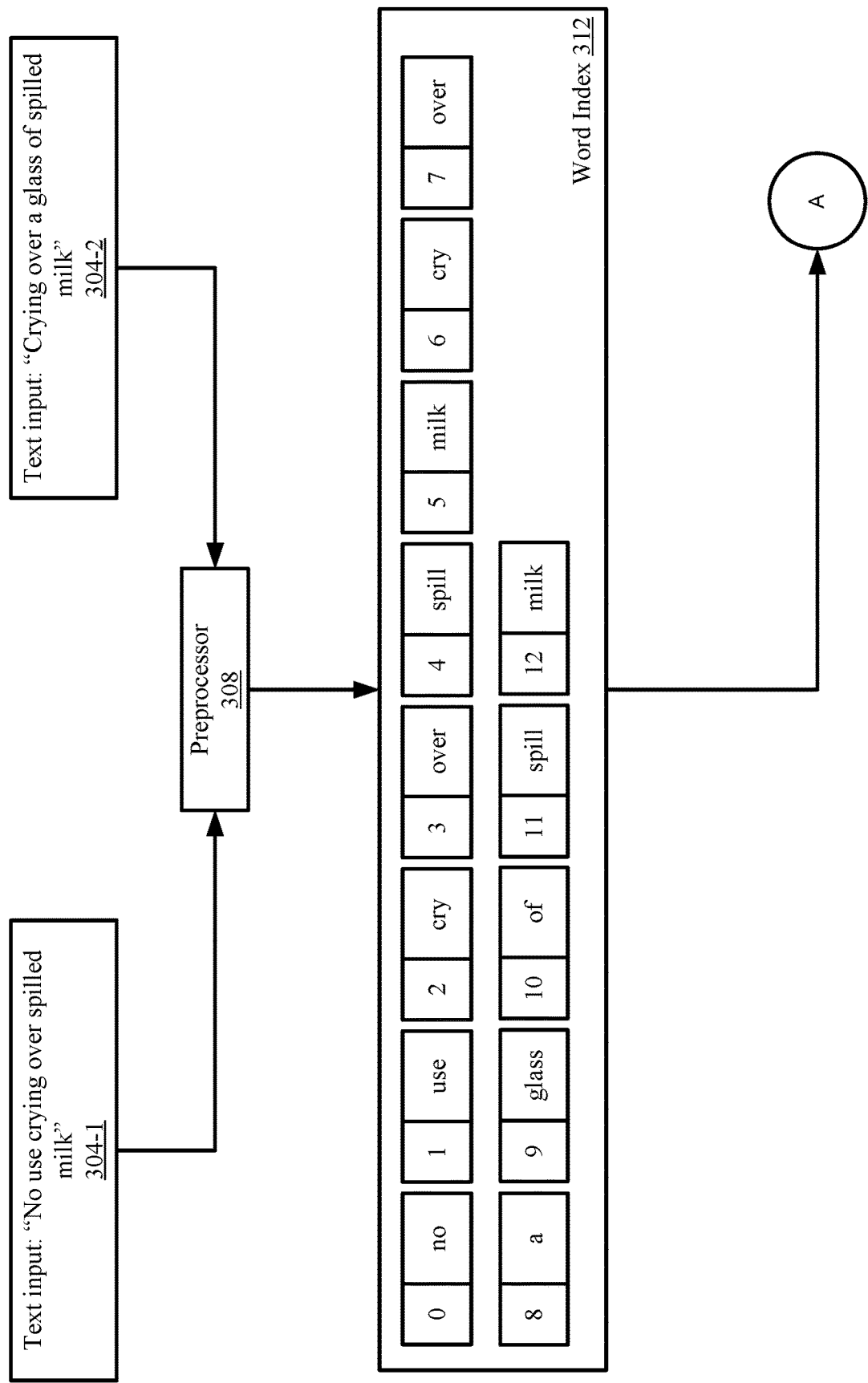
FIG. 3A depicts a block diagram illustrating the normalization of incoming communications, according to at least one aspect of the present disclosure.

FIG. 3A depicts a block diagram illustrating the normalization of incoming communications, according to at least one aspect of the present disclosure. Two or more communications 304-1 and 304-2 are received by a natural language node. Communication 304-1 includes alphanumeric characters that form the phrase: "No use crying over spilled milk." Communication 304-includes alphanumeric characters that form the phrase: "crying over a glass of spilled milk". Although two communications are shown, any number of communications may be received and processed with communications 304-1 and 304-2. The communications are passed to preprocessor 308, which normalizes and aggregates the alphanumeric text of communications into a word index.

Preprocessor 308 normalizes the alphanumeric characters to a form that can be analyzed by the natural language processing. Normalization begins by replacing punctuation used to concatenate characters (e.g., hyphens, apostrophes, etc.) with white spaces. Preprocessor 308 then removes the remaining non-alphanumeric characters. Trailing spaces, returns, and line breaks may then be removed. Capital letters may be replaced with corresponding lower case letters. A parser tokenizes the remaining alphanumeric characters into a set of words by defining characters between spaces as a word. The first word and the last may be defined differently due to the lack of a space before the first character or after the last character. For instance, the first word may be defined by starting aggregating all of the alphanumeric characters up to the first space. The last word may be defined by aggregating the alphanumeric characters after the last space. The set of words may be lemmatized (e.g., reduced to a base form). For instance, the word 'crying' is the present simple form of the verb "to cry". Lemmatizing "crying" converts the word to the base form "cry".

The preprocessor outputs word index 312 that stores the words of the communications in key/value pairs. The key is equal to the word and the value is equal to the index of the word index in which the word is stored. For example, word index 312 includes the following from the preprocessing of communications 304-1 and 304-2: (0, 'no'), (1, 'use'), (2, 'cry'), (3, 'over'), (4, 'spill'), (5, 'milk'), (6, 'cry'), (7, 'over'), (8, 'a'), (9, 'glass'), (10, 'of'), (11, 'spill'), (12, 'milk').

Figure 3B:
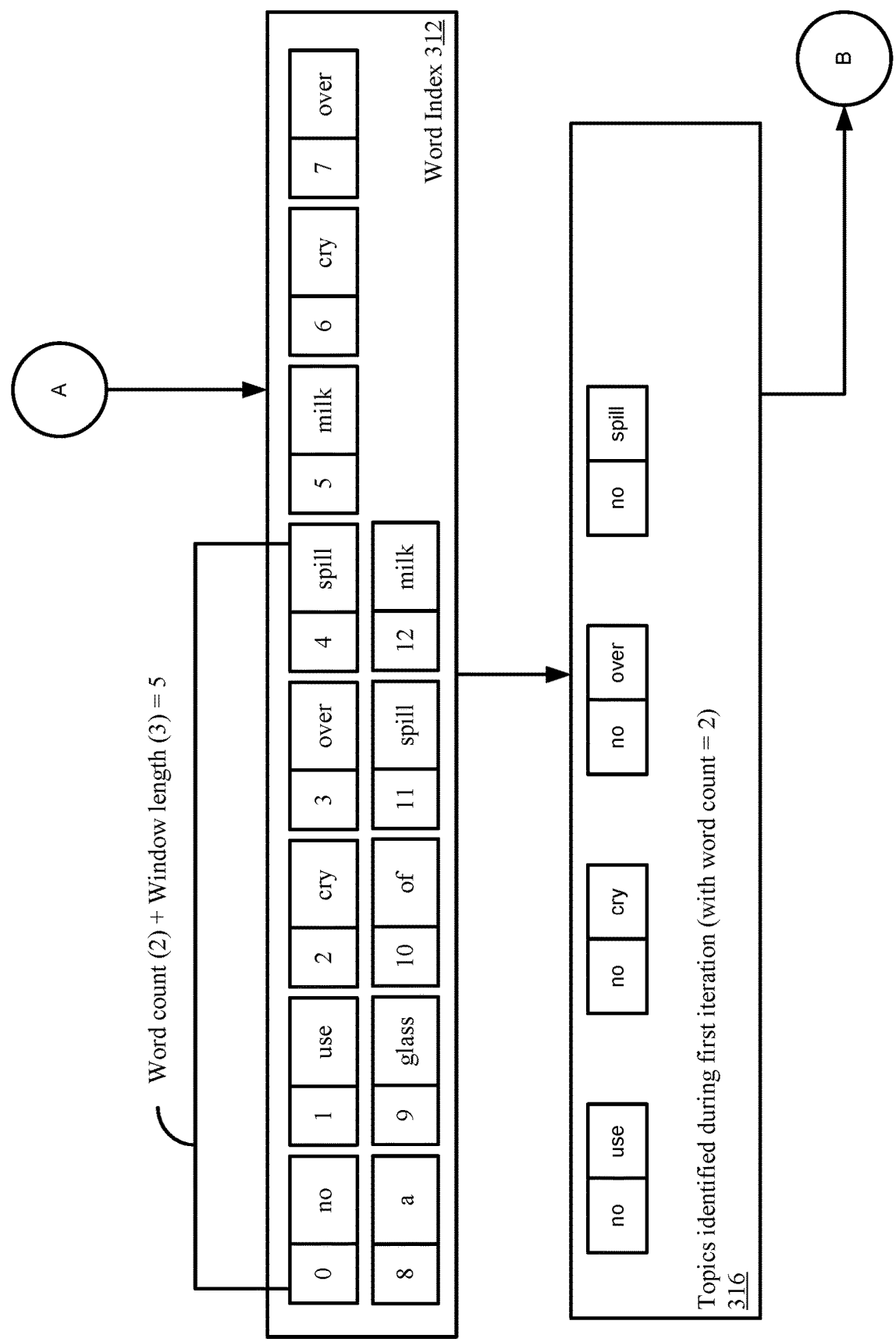
FIG. 3B depicts an example of a block diagram continuing from FIG. 3A illustrating a first iteration of word collocation in which topics are generated from a word index, according to at least one aspect of the present disclosure.

FIG. 3B depicts an example of a block diagram continuing from FIG. 3A illustrating a first iteration of word collocation in which topics are generated from a word index, according to at least one aspect of the present disclosure. Word collocation is the process of generating topics (e.g., two or more words of the word index positioned in a same order as the words are positioned in word index 312). A window length value may be used for selecting topics in which the words do not appear next to each other. The window length value may indicate possible gaps that can occur between words of a topic. A word count value indicates an initial quantity of words included in a topic. In some instances, the word count value may be predetermined, set by user input, or the like. For instance, the word count value may have a predetermined value of two unless overridden by user input. During topic generation, the word count value may be incremented, increasing the quantity of words in successively generated topics. A sliding window for selecting words from the word index may be defined. The sliding window may be equal to the word count value plus the window length value.

In some instances, the natural language node may select the window length value based on a word index. For instance, if the window is small, the words are more likely to be proximate to each other. While this can include added semantic information (e.g., such as 'blue', 'car'), in some cases the resulting topic may lack semantic information representative of the underlying communication (e.g., such as 'use', 'cry' from word index 312). Larger windows have the possibility of generating topics with more semantic information by being flexible with respect to the proximity of the two or more words. Using larger windows, a same topic may be generated from phrases that may be worded differently (due to different idioms or regional dialects) such as communication 304-1 and 304-2. Large windows may also generate topics that are irrelevant when the words are too far apart from each other (e.g., such as 'no', 'glass' from word index 312), which is not representative of the meaning of communication 304-1 or 304-2. In the examples of FIG. 3A-FIG. 3E, the window length value is set to three allowing the words of topics to be selected from the word index 312 with up to three words separating a first word and a second word of the topic.

The natural language node iterates over word index 312 generating sets of topics based on the position of the sliding window during each iteration. At the end of an iteration, the sliding window is incremented by one index value and the next iteration begins. For instance, a current index value representing a first index value for the sliding window is defined and initialized to index value zero. For instance, during the first iteration the sliding windows is positioned at index value zero and ends at index value 4 (e.g., word count value plus window length value minus one). The natural language node generates all of the topics that occur within the sliding window with each topic including two words. During each iteration, the first word of each topic is the word positioned at the current index value (e.g., the first index value of the sliding window, which is 'no' during this first iteration). This prevents counting the same topic twice when the sliding window is incremented. During the first iteration, the natural language node generates topics 316: ('no', 'use'), ('no', 'cry'), ('no', 'over'), ('no', 'milk').

Figure 3C:
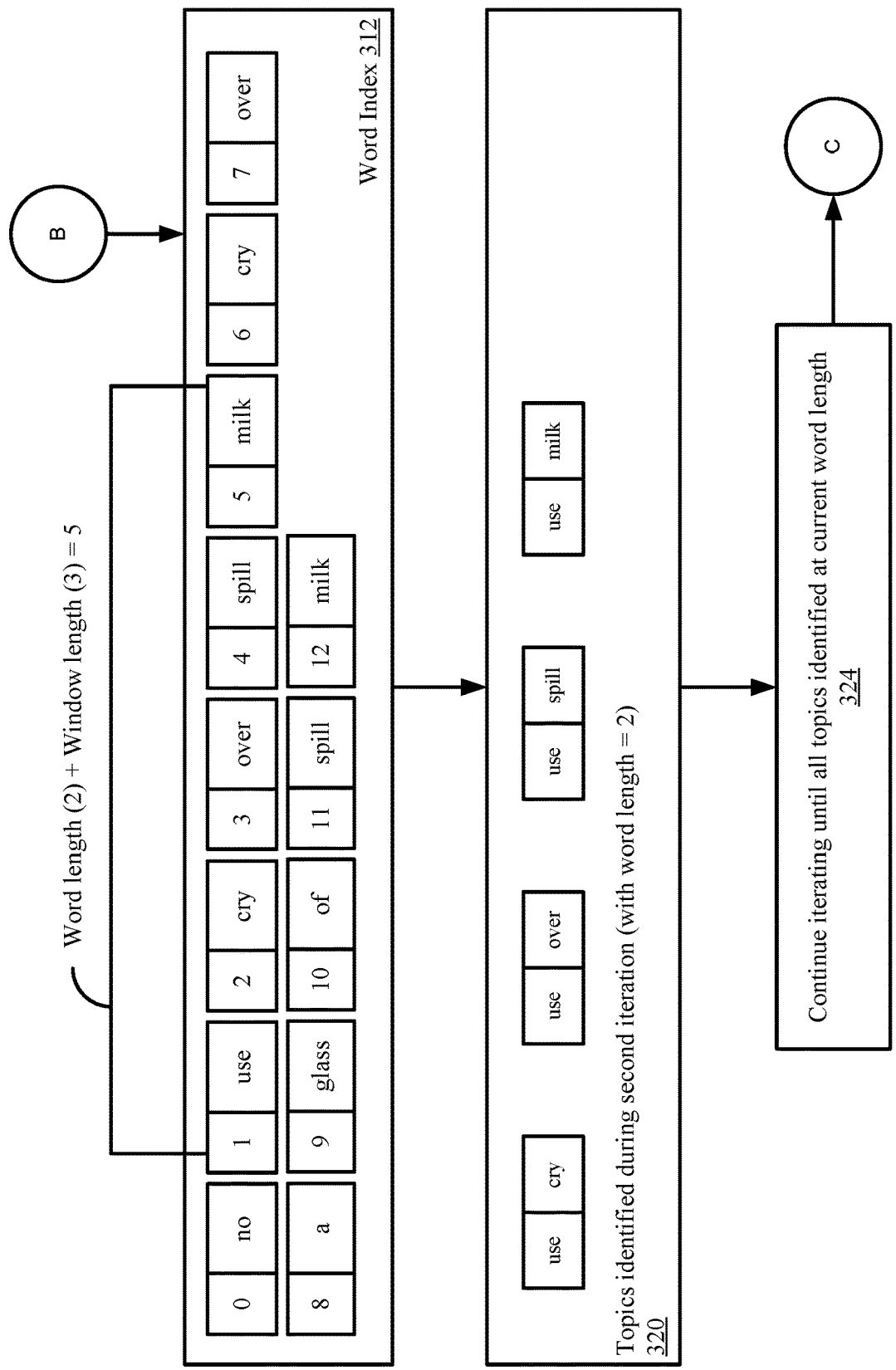
FIG. 3C depicts an example of a block diagram continuing from FIG. 3B illustrating a subsequent iteration word collocation, according to at least one aspect of the present disclosure.

FIG. 3C depicts an example of a block diagram continuing from FIG. 3B illustrating a subsequent iterations of the word collocation, according to at least one aspect of the present disclosure. Once the previous iteration terminates, the current index value is incremented by one (e.g., from index value zero to index value one) causing the sliding window to be positioned between index value one and index value five. The first word of each topic during this iteration is the word positioned at the current index value (e.g., the word 'use'). The topics 320 ('use', 'cry'), ('use', 'over'), ('use', 'spill'), ('use', 'milk') may be generated.

The process continues (e.g., at block 324) incrementing the current index value (e.g., at block 324) and generating topics until the current index value is equal to the word index size minus the sliding window size (e.g., the word count value plus the window length value). This occurs when the sliding window includes the last word in the word index (e.g., index value twelve of word index 312). When the sliding window can no longer be incremented due to exceeding the length of the word index, the natural language node can generate topics of all possible combinations of ordered words including those that have a first word other than the word positioned at the current index value.

For instance, during the final iteration the current index value is set to eight and the sliding window includes (8, 'a'), (9, 'glass'), (10, 'of'), (11, 'spill'), (12, 'milk'). The natural language node generates the following topics: ('a', 'glass'), ('a', 'of'), ('a', 'spill'), ('a', 'milk'), ('glass', 'of'), ('glass', 'spill'), ('glass', 'milk'), ('of', 'spill'), ('of', 'milk'), and ('spill', 'milk').

Figure 3D:
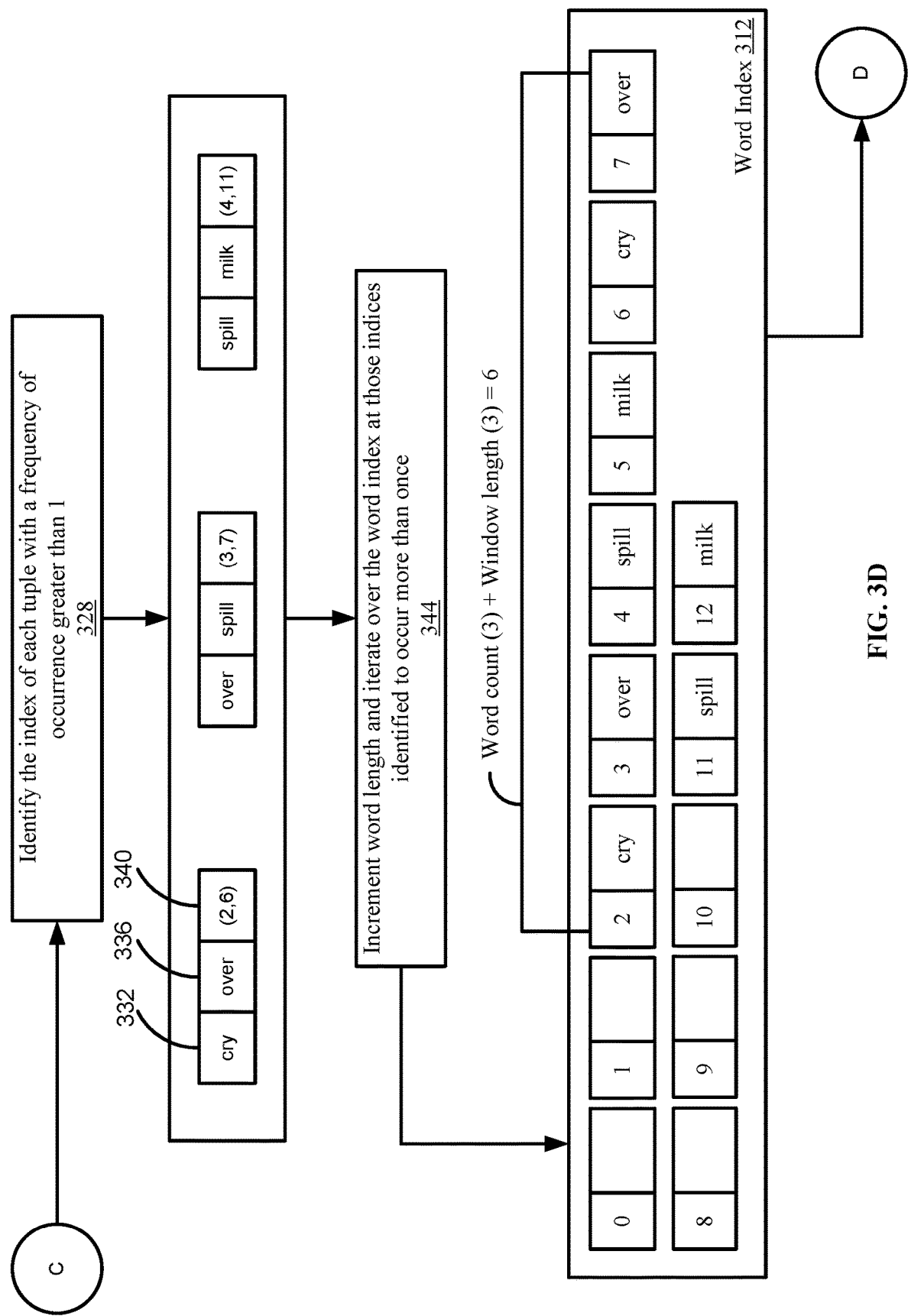
FIG. 3D depicts an example of a block diagram continuing from FIG. 3C in which topics are identified from a word index, according to at least one aspect of the present disclosure.

FIG. 3D depicts an example of a block diagram continuing from FIG. 3C illustrating a subsequent iteration of the word collocation, according to at least one aspect of the present disclosure. Once the all of the two-word topics are generated (or the topics of a length equal to the word count value set by user input or the natural language node), the word count value may be incremented to identify topics of a greater word quantity. The larger the word quantity the greater the number of topics generated. For instance a sliding window of a size five with two-word topics generates four topics per iteration. Incrementing the word count value to three-word topics (which also increments the sliding window) generates ten topics per iteration. This may increase the volume of topics that may need to be processed later.

The processing resources consumed for subsequent word count values can be significantly reduced by eliminating words of the word index. For example, since every topic includes a quantity of words equal to the word count value, a subset of the topics will be generated at the incremented word count value. In other words, words that do not appear in the reoccurring two-word topics will not appear in three-word topics so they need not be considered when generating larger topics. Subsequent iterations over the reduced word index 312 may produce less topics, but the topics generated will be a better representation of the overall semantics of the communications.

At block 328, the natural language node determines words that can be removed from word index 312 by identifying an index value for each two-word topic that occurs at a frequency greater than one (e.g., the words of a topic appear more than once in word index 312). In the example, of FIG. 3A-3E, three topics occur more than once in word index 312. The natural language node may define a tuple that includes, the first word of the topic of the topic 332, the second word of the topic 336 (in order), and a list of indices 340. Since tuples are generated for only those topics that occur greater than once, the indices of each tuple include at least two index values, one for the index value of each occurrence of the topic. For instance, the tuple ('cry', 'over', (2,6)) begins at index value two and again at index value six.

The natural language node determines that three topics occur more than once at indices two, three, four, six, seven, and eleven. If too many topics occur more than once, the natural language node may increase the frequency threshold to reduce the number of topics. The natural language node may generate tuples ('cry', 'over', (2,6)), ('over', 'spill', (3,7)), and ('spill', 'milk', (4,11)) for the reoccurring topics. The natural language node may remove the words in index values that do not appear in a tuple. The words at index value zero, index value one, index value eight, index value nine, and index value 10 are removed from word index 312.

The natural language node increments the word count value at 344 and sets the current index value to the smallest index value in the tuples (e.g., index value two) then iterates over the remaining words of the word index. By eliminating index values of the word index, the natural language node avoids generating and processing approximately thirty five topics. This increases the performance of the natural language node both reducing processing resources and the time needed to iterate over word index 312.

Figure 3E:
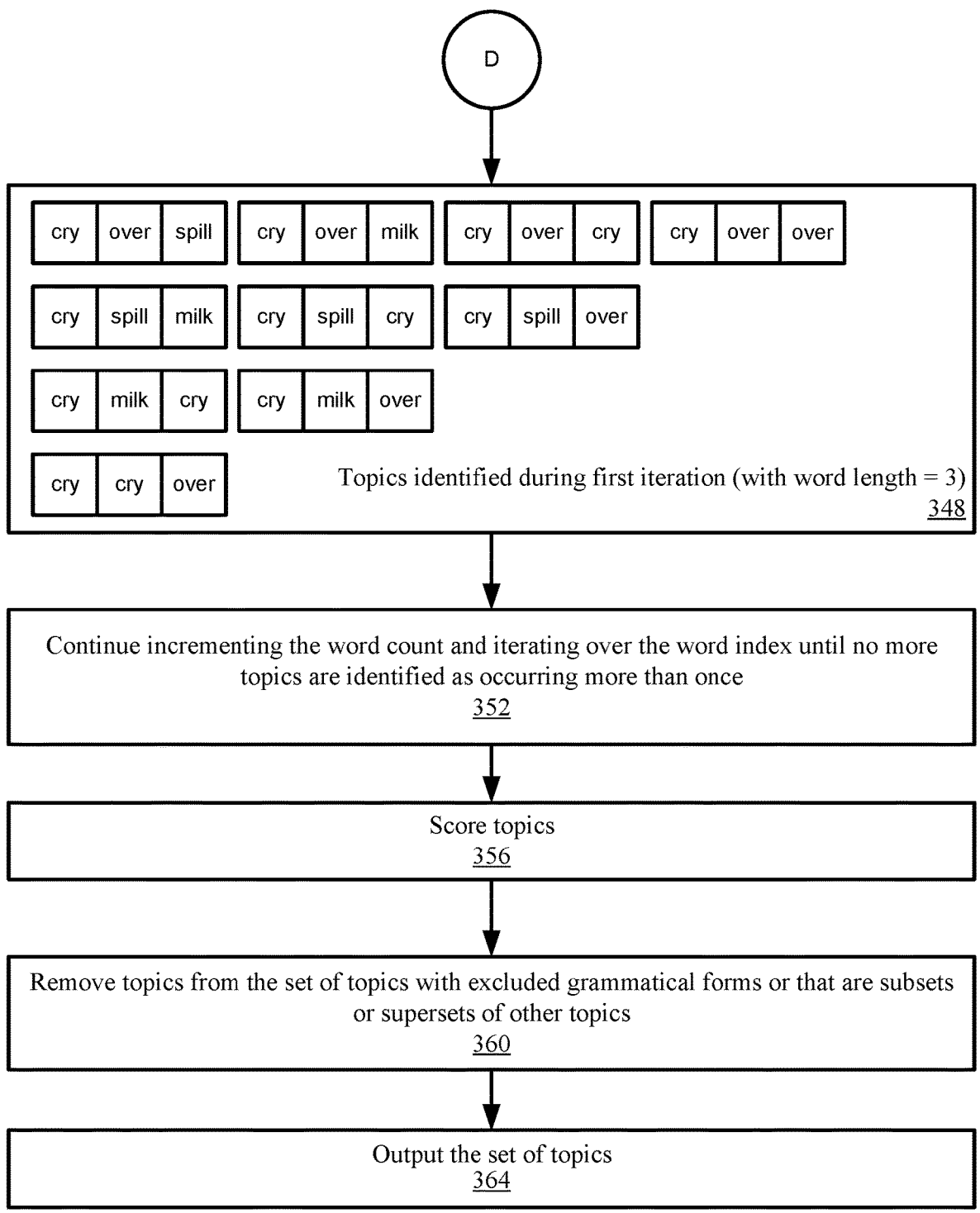
FIG. 3E depicts an example of a block diagram continuing from FIG. 3D illustrating the processing of topics prior to presentation, according to at least one aspect of the present disclosure.

FIG. 3E depicts an example of a block diagram continuing from FIG. 3D illustrating the processing of topics prior to presentation, according to at least one aspect of the present disclosure. The natural language node generates three-word topics by iterating over the remaining words of word index 312. For instance, during the first iteration over word index 312, the natural language node generates topics 348. The three-word topics generated from word index 312 over the first iteration include, for example, ('cry', 'over', 'spill'), ('cry', 'over', 'milk'), ('cry', 'over', 'cry'), ('cry', 'over', 'over'), ('cry', 'spill', 'milk'), ('cry', 'spill', 'cry'), ('cry', 'spill', 'over'), ('cry', 'milk', 'cry'), ('cry', 'milk', 'over'), and ('cry', 'cry', 'over'). The natural language node continues incrementing over word index 312 until all of the three-word topics have been generated.

At block 352, the natural language node then continues by incrementing the word count value to generate larger topics in similar manner as described in connection to FIGS. 3C and 3D such as identifying the three-word topics that occur with a frequency greater than one, generating tuples that include the indices of the reoccurring three-word topics, removing the words at indices not included in the tuples, increment the word count value, and generating larger topics by iterating over the remaining words of word index 312. In some instance, this process may continue until there are no generated topics that include at least one topic that occurs with a frequency greater than one. For instance, the natural language node generates a single four-word topic ('cry', 'over', 'spill', 'milk'). Since this four-word topic only appears once, the process terminates after its generated.

In other instances, the process terminates once a predetermined number of topics have been generated or when topics of a predetermined size are reached (e.g., four words, five words, etc.). In those instances, the natural language processer may determine when to terminate the process or the process may terminate upon receive user input.

At block 356, the topics generated by the natural language processer are scored according to a ranking function. In some instances, the score may be based on a number of factors such as a quantity of words stored by the topic, frequency in which the topic occurs in word index 132, frequency in which individual words of the topic occur (in a different order or outside the topic) in word index 132, combinations thereof, and the like. For example, the score may be defined by $$\text{score} = \frac{f^l}{\prod \sqrt{n}}$$

where f is equal to the number of times (e.g., the frequency) that the topic occurs, l is equal to the quantity of words in the topic (e.g., topic length), and n is equal to the number of times that each word the topic occurs minus f. In some instances the score may be re-defined as $$\text{score} = \frac{f^l}{\prod \sqrt{x_i - f}}$$

where $x_i$ represents the total number of times a word (x) at each position (i) of the topic occurs in the word index.

At block 360, the topics generated at blocks 312-325 are then filtered by removing topics that include restricted grammatical forms (e.g., conjunctions, subordinating conjunctions, and/or correlative conjunctions that appear first and/or last in the words of a topic) and topics that are subset or supersets of other topics. The natural language node identifies redundant topics in the topic list. Redundant topics are topics that are subsets or a supersets of other topics. The natural language node evaluates the topics for redundancy against a dictionary. The dictionary represents words of a topic using key/value pairs, where a key represents a unique word and the corresponding value is equal to the index value of the topic in the word index. If a word of a new topic is already in a dictionary (e.g., identified by matching keys), then the new topic may be a subset or a superset of an existing topic. The natural language node determines if an intersection of all the words of topics positioned at the index value of the word of the new topic is zero (e.g., an empty set) or non-zero. If the intersection is zero (or an empty set), then the new topic is not a subset or superset of an already identified topic. If the intersection is non-zero, then some words overlap between the new topic and the topic of the dictionary. The natural language node may then identify the topic with a higher score and discard the topic with the lower score.

At block 364, the natural language node outputs the filtered topics. The filtered topics may be presented along with a frequency in which each filtered topic occurs within a set of communications, the score of each filtered topic, and the like. In some instances, the natural language node stores the filtered topics in a dictionary for later use with new communications (corresponding to a same object or service). In other instances, the natural language node presents the filter topics via user interface. User input may manipulate the filtered topics such as by selecting particular filtered topics for further analysis, presenting communications that correspond to particular topics, transmitting the one or more filtered topics to a remote device, presenting the frequency with which a particular filtered topic appeared in a set of communications, combinations thereof and the like.

Figure 4:
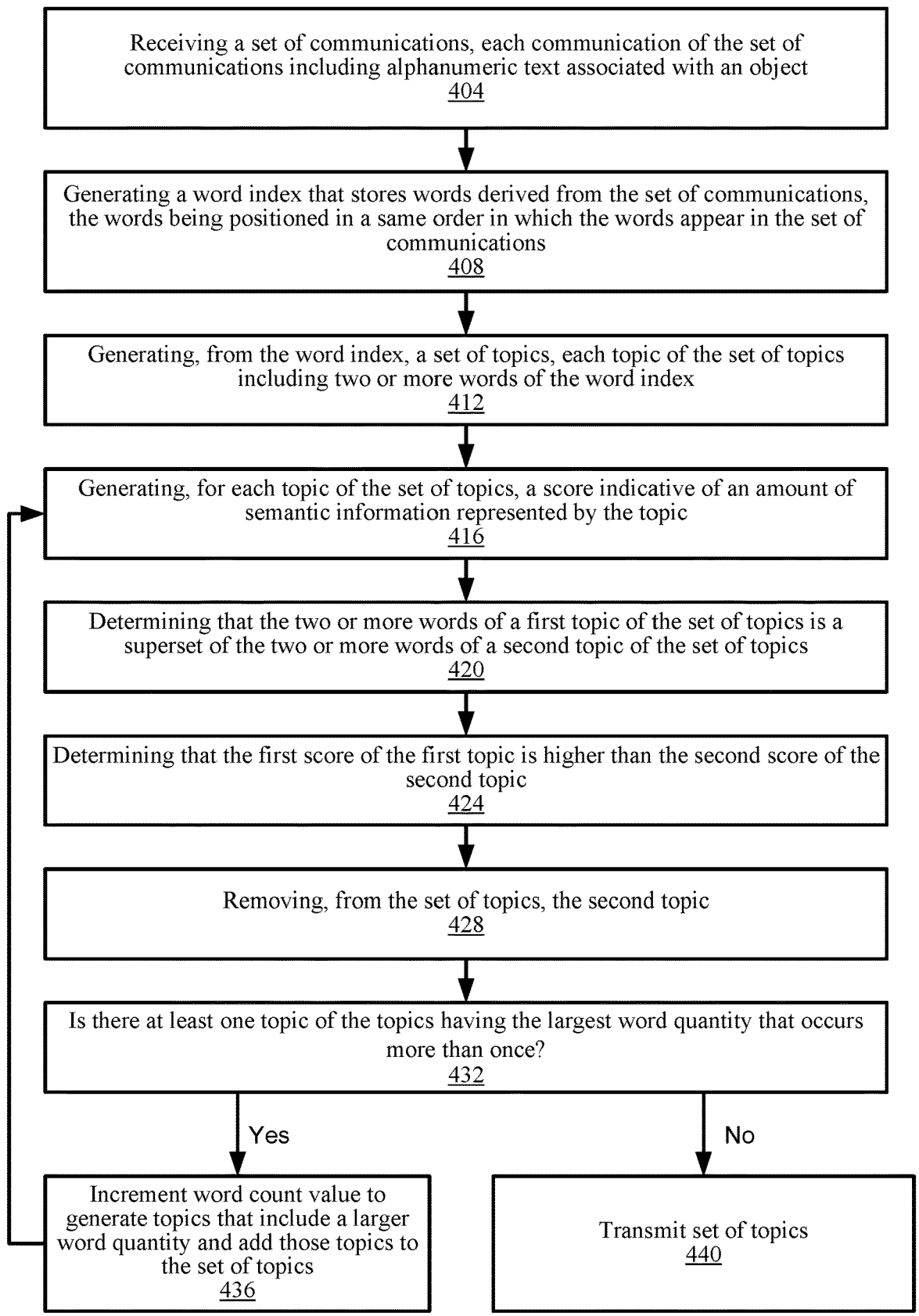
FIG. 4 depicts an example of a process for identifying communications from communications, according to at least one aspect of the present disclosure.

FIG. 4 depicts an example of a process for identifying topics communications from communications, according to at least one aspect of the present disclosure. At block 404 a computing device may receive a set of communications. In some instances, the communications may be received from one or more remote user devices or from a webserver that received the communications from the one or more remote user devices (e.g., such as through a post on a webpage, review, survey, text-based form, or the like). For instance the computing device may execute a web crawler to obtain communications stored by the webserver in association with a product or service. The communications may include a set of alphanumeric characters (such as text) in a natural language format.

At block 408, a word index is generated using the alphanumeric text. In some instances, one or more preprocessors may normalize the alphanumeric characters prior to generating the word index. The alphanumeric text may be preprocessed by removing punctuation and other symbols, removing excess white-spaces, tokenizing the alphanumeric characters into a set of words, and lemmatizing the set of words. The word index stores the set of words in a same position as the words appear in the alphanumeric characters (or the set of words). The words in each communication are stored in an order in which the communications were received, according to an identifier of each communication (e.g., a universally unique identifier or the like), according to a timestamp of the communications (e.g., when the communication was generated by a user device, transmitted by a user device, posted on a webpage, transmitted to the computing device, or the like), or the like.

The word index stores words according to key/value pairs in which the key is the word and the value corresponds to the position of the word within the index (e.g., an integer reference of the position within the index).

At block 412, a set of topics is generated from the words of the word index. The set of topics are generated by generating a sliding window equal to a word count value plus a window length value. The window length value indicates a number of words that may come between the words of the topic. The sliding window begins at a current index value (e.g., initially at zero or at a predetermined position of the index) and iterates over the word index identifying all topics of a size equal to the word count value (e.g., initially set to two or a predetermined topic size). For instance, at a word count value of two each topic includes two words within the sliding window of the word index with the first word being the word positioned at the current index value. Once the set of topics are generated (e.g., all combinations of words in the sliding window with the first word of each being the word positioned at the current index value), the sliding window is incremented (e.g., the current index value is incremented by one), and another iteration begins. This process continues until the sliding window covers each index value of the word index and the set of topics includes all topics that could be generated at the current word count value.

At block 416, each topic in the set of topics is assigned a score. In some instances, the score may be generated based on a number of factors such as a quantity of words stored by the topic, frequency in which the topic occurs in the word index, frequency in which individual words of the topic occurs (in a different order or outside the topic) in word index 132, combinations thereof, and the like. For example, the score may be defined by $$\text{score} = \frac{f^l}{\prod \sqrt{n}}$$

where f is equal to the number of times (e.g., the frequency) that the topic occurs, l is equal to the quantity of words in the topic (e.g., topic length), and n is equal to the number of times that each word in the topic occurs minus f. In some instances the score may be re-defined as $$\text{score} = \frac{f^l}{\prod \sqrt{x_i - f}}$$

where $x_i$ represents the total number of times a word (x) at each position (i) of the topic occurs in the word index.

At block 420, the computing device may determine whether a first topic is a superset or subset of a second topic. For instance, a first topic is a subset of a second topic if all of the words of first topic also appear in the second topic in the same order. The first topic is a superset of the second topic if all of the words of the second topic appear in the first topic in the same order as the words appear in the second topic.

At block 424, the computing device, in response to determining that the first topic is a subset or a superset of the second topic, compares a first score assigned to the first topic to a second score assigned to the second topic.

At block 428, the computing devices removes the second topic from the set of topics. When a subset or superset is identified, the computing device removes the topic with the lower score. If the first topic has a higher score, then the second topic is discarded from the set of topics. If the second topic has a higher score, then the first topic is discarded from the set of topics.

In some instances, one or more additional topics may be removed from the set of topics. In one example, topics that include a conjunction, subordinating conjunction, or correlative conjunction may be removed from the set of topics. For instance, if the conjunction, subordinating conjunction, and/or correlative conjunction does not occur in the middle of the words of the topic (e.g., after a first word and before the last word), then the topic may be discarded. In some instances, the computing device may generate a list of stop words or stop topics. Topics that include the stop words or stop topics may be discarded without further analysis.

At block 432, the computing device may determine if there is at least one topic in the set of topics that occurs more than once (e.g., topic occurs more than once in the word index at different index values). If at least one topic does occur more than once (or more than a predetermined frequency), the index value of the word index of each word of the topics that are reoccurring is stored. The words positioned at an index values that are not one of the stored index values may be removed from the word index (or suppressed such that these indices are not considered during subsequent iterations). At block 436, then the word count value is incremented by one, the current index value is reset to zero (or the predetermined initialization index value), and the sliding window length is incremented by one. The process then repeats iteratively generating new topics to be added to the set of topics from the remaining words of the word index. These topics may be of a larger size (e.g., including an additional word due to incrementing the word count value). The process then returns to block 416 in which the new topics are assigned a score (e.g., using a same function as used on the previous topics or a different function).

If, at block 432, at least one topic does not occur with a frequency greater than one, the process continues at block 440, where the set of topics are output. In some instances, the set of topics may be transmitted to another remote device such a user device, a database, or a display device. In other instances, the set of topics may be presented on a display device. For instance, the topics may be presented as text or as graphical objects. Each topic may be presented including the frequency with which the topic occurs among the set of communications, the text of the communications that include a particular topic, an object and/or service associated with the topic, other topics associated with a same communication, object, and/or service, metadata associated with the user device that transmitted communications that include the topic such as a hardware profile of the user device (e.g., processor speed and type, memory type, age of the device, geographical location of the user device, media access control address of the user device, device type (desktop computer, laptop, tablet, or mobile device), combinations thereof and the like), software profile of the device (e.g., software installed on the device such as operating system type and version number, browser type, etc.), user profile of a user of the user device (e.g., demographic data, browsing history, etc.).

Although the blocks of FIG. 2 and FIG. 4 are described in a particular order, each block may be executed once, more than once, in the order described, or in any particular order without departing from the spirit or scope of the present disclosure.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method comprising:
    receiving, at a first computing device, a set of communications, each communication of the set of communications including alphanumeric text;
    generating a word index, the word index including words derived from the alphanumeric text of each communication of the set of communications and in an order in which the words appear in the set of communications;
    generating, from the word index, a set of topics, each topic of the set of topics including two or more words of the word index;
    generating, for each topic of the set of topics, a score indicative of an amount of semantic information represented by a respective topic, wherein the score is generated based on at least a quantity of words in the respective topic and a number of times in which each word of the respective topic occurs in the word index;
    determining that the two or more words of a first topic of the set of topics are included in the two or more words of a second topic of the set of topics;
    determining, based on comparing the score for the first topic with the score for the second topic, that the score for the first topic is higher than the score for the second topic;
    removing the second topic from the set of topics; and
    transmitting, to a second computing device, the set of topics.

2. The method of claim 1, further comprising:
    receiving an indication of user input corresponding to a selection of a particular object from a plurality of objects; and
    transmitting an indication of one or more topics of the set of topics that correspond to the particular object.

3. The method of claim 1, further comprising:
    receiving an indication of user input corresponding to a selection of a particular topic from the set of topics; and
    transmitting an indication of a subset of the set of communications, each communication of the subset of the set of communications including the two or more words of the particular topic.

4. The method of claim 1, wherein generating the set of topics includes:
    receiving a word length value and a window length value; and
    iterating over the word index, wherein a current index value is initially set to an initial index value, wherein iterating over the index continues until the current index value exceeds a threshold value, and wherein iterating over the index includes:
  generating a plurality of topics, each topic of the plurality of topics including:
    two or more words selected from the word index, wherein the two or more words are positioned in a same order as the two or more words appear in the word index;
    the two or more words including a first word that is positioned at the current index value of the index; and
  incrementing the current index value by one.

5. The method of claim 1, wherein generating the score is further based on a number of times in which the respective topic is generated from the word index.

6. The method of claim 1, wherein determining that the two or more words of the first topic of the set of topics are included in the two or more words of the second topic of the set of topics includes:
  determining that a first word of the two or more words of the first topic is located in a dictionary by matching a key associated with the first word to a key stored in the dictionary, the key stored in the dictionary being associated with an index value; and
  in response to determining that the first word is located in the dictionary, determining that the first word and words of the set topics positioned at the index value intersect.

7. The method of claim 1, further comprising:
  removing, from the set of topics, a third topic that includes a first word that is a conjunction.

8. A system comprising:
  one or more processors;
  a non-transitory computer-readable medium storing instructions that when executed by the one or more processors, cause the one or more processors to perform operations including:
    receiving a set of communications, each communication of the set of communications including alphanumeric text;
    generating a word index, the word index including words derived from the alphanumeric text of each communication of the set of communications and in an order in which the words appear in the set of communications;
    generating, from the word index, a set of topics, each topic of the set of topics including two or more words of the word index;
    generating, for each topic of the set of topics, a score indicative of an amount of semantic information represented by a respective topic, wherein the score is generated based on at least a quantity of words in the respective topic and a number of times in which each word of the respective topic occurs in the word index;
    determining that the two or more words of a first topic of the set of topics are included in the two or more words of a second topic of the set of topics;
    determining, based on comparing the score for the first topic with the score for the second topic, that the score for the first topic is higher than the score for the second topic;
    removing the second topic from the set of topics; and
    transmitting the set of topics.

9. The system of claim 8, wherein the operations further include:
  receiving an indication of user input corresponding to a selection of a particular object from a plurality of objects; and
  transmitting an indication of one or more topics of the set of topics that correspond to the particular object.

10. The system of claim 8, wherein the operations further include:
  receiving an indication of user input corresponding to a selection of a particular topic from the set of topics; and
  transmitting an indication of a subset of the set of communications, each communication of the subset of the set of communications including the two or more words of the particular topic.

11. The system of claim 8, wherein generating the set of topics includes:
  receiving a word length value and a window length value; and
  iterating over the word index, wherein a current index value is initially set to an initial index value, wherein iterating over the index continues until the current index value exceeds a threshold value, and wherein iterating over the index includes:
    generating a plurality of topics, each topic of the plurality of topics including:
      two or more words selected from the word index, wherein the two or more words are positioned in a same order as the two or more words appear in the word index;
      the two or more words including a first word that is positioned at the current index value of the index; and
    incrementing the current index value by one.

12. The system of claim 8, wherein generating the score is further based on a number of times in which the respective topic is generated from the word index.

13. The system of claim 8, wherein determining that the two or more words of the first topic of the set of topics are included in the two or more words of the second topic of the set of topics includes:
  determining that a first word of the two or more words of the first topic is located in a dictionary by matching a key associated with the first word to a key stored in the dictionary, the key stored in the dictionary being associated with an index value; and
  in response to determining that the first word is located in the dictionary, determining that the first word and words of the set topics positioned at the index value intersect.

14. The system of claim 8, further comprising:
  removing, from the set of topics, a third topic that includes a first word that is a conjunction.

15. A non-transitory computer-readable medium storing instructions that when executed by one or more processors, cause the one or more processors to perform operations including:
  receiving a set of communications, each communication of the set of communications including alphanumeric text;
  generating a word index, the word index including words derived from the alphanumeric text of each communication of the set of communications and in an order in which the words appear in the set of communications;
  generating, from the word index, a set of topics, each topic of the set of topics including two or more words of the word index;

generating, for each topic of the set of topics, a score indicative of an amount of semantic information represented by a respective topic, wherein the score is generated based on at least a quantity of words in the respective topic and a number of times in which each word of the respective topic occurs in the word index;

determining that the two or more words of a first topic of the set of topics are included in the two or more words of a second topic of the set of topics;

determining, based on comparing the score for the first topic with the score for the second topic, that the score for the first topic is higher than the score for the second topic;

removing the second topic from the set of topics; and transmitting the set of topics.

16. The non-transitory computer-readable medium of claim 15, wherein the operations further include:

receiving an indication of user input corresponding to a selection of a particular object from a plurality of objects; and transmitting an indication of one or more topics of the set of topics that correspond to the particular object.

17. The non-transitory computer-readable medium of claim 15, wherein the operations further include:

receiving an indication of user input corresponding to a selection of a particular topic from the set of topics; and transmitting an indication of a subset of the set of communications, each communication of the subset of the set of communications including the two or more words of the particular topic.

18. The non-transitory computer-readable medium of claim 15, wherein generating the set of topics includes:

receiving a word length value and a window length value; and iterating over the word index, wherein a current index value is initially set to an initial index value, wherein iterating over the index continues until the current index value exceeds a threshold value, and wherein iterating over the index includes:

generating a plurality of topics, each topic of the plurality of topics including:

two or more words selected from the word index, wherein the two or more words are positioned in a same order as the two or more words appear in the word index;

the two or more words including a first word that is positioned at the current index value of the index; and incrementing the current index value by one.

19. The non-transitory computer-readable medium of claim 15, wherein generating the score is further based on a number of times in which the respective topic is generated from the word index.

20. The non-transitory computer-readable medium of claim 15, wherein determining that the two or more words of the first topic of the set of topics are included in the two or more words of the second topic of the set of topics includes:

determining that a first word of the two or more words of the first topic is located in a dictionary by matching a key associated with the first word to a key stored in the dictionary, the key stored in the dictionary being associated with an index value; and in response to determining that the first word is located in the dictionary, determining that the first word and words of the set topics positioned at the index value intersect.

* * * * *